United States Patent
Gottin et al.

(10) Patent No.: US 10,324,845 B1
(45) Date of Patent: Jun. 18, 2019

(54) AUTOMATIC PLACEMENT OF CACHE OPERATIONS FOR COMPLEX IN-MEMORY DATAFLOWS

(71) Applicant: EMC IP Holding Company LLC, Hopkinton, MA (US)

(72) Inventors: Vinicius Michel Gottin, Rio de Janeiro (BR); Edward José Pacheco Condori, Rio de Janeiro (BR); Jonas F. Dias, Rio de Janeiro (BR); Angelo E. M. Ciarlini, Rio de Janeiro (BR); Bruno Carlos da Cunha Costa, Teresópolis (BR); Wagner dos Santos Vieira, Rio de Janeiro (BR); Paulo de Figueiredo Pires, Rio de Janeiro (BR); Fábio André Machado Porto, Petrópolis (BR); Yania Molina Souto, Petrópolis (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/662,704

(22) Filed: Jul. 28, 2017

(51) Int. Cl.
| | |
|---|---|
| *G06F 12/12* | (2016.01) |
| *G06F 12/0815* | (2016.01) |
| *G06F 12/0875* | (2016.01) |

(52) U.S. Cl.
CPC ...... *G06F 12/0815* (2013.01); *G06F 12/0875* (2013.01); *G06F 2212/604* (2013.01)

(58) Field of Classification Search
CPC .......................... G06F 12/0815; G06F 12/0875
USPC .......................................................... 711/141
See application file for complete search history.

(56) References Cited

U.S. PATENT DOCUMENTS

| | | | |
|---|---|---|---|
| 7,260,819 B2 * | 8/2007 | Spotswood | G06F 8/60 717/177 |
| 2003/0061272 A1 * | 3/2003 | Krishnamurthy | G06F 16/9574 709/203 |
| 2004/0243764 A1 * | 12/2004 | Miller | G06F 12/0882 711/118 |

OTHER PUBLICATIONS

Dias et al., "Provenance-Oriented Optimization for HPC Workflows", U.S. Appl. No. 14/580,732, filed Dec. 23, 2014.
Pinho et al., "Method and Apparatus for Data Pre-processing in Dataflow Operations", U.S. Appl. No. 15/191,755, filed Jun. 24, 2016.

(Continued)

*Primary Examiner* — Jae U Yu
(74) *Attorney, Agent, or Firm* — Ryan, Mason & Lewis, LLP

(57) ABSTRACT

Techniques are provided for automatic placement of cache operations in a dataflow. An exemplary method obtains a graph representation of a dataflow of operations; determines a number of executions and a computational cost of the operations, and a computational cost of a caching operation to cache a dataset generated by an operation; establishes a dataflow state structure recording values for properties of the dataflow operations for a number of variations of caching various dataflow operations; determines a cache gain factor for dataflow operations as an estimated reduction in the accumulated cost of the dataflow by caching an output dataset of a given operation; determines changes in the dataflow state structure by caching an output dataset of a different operation in the dataflow; and searches the dataflow state structures to determine the output datasets to cache based on a total dataflow execution cost.

20 Claims, 10 Drawing Sheets

(56) References Cited

OTHER PUBLICATIONS

Norvig, P., "Paradigms of Artificial Intelligence Programming: Case Studies in Common LISP", Morgan Kaufmann Publishers, Inc. (2014) ISBN 9780080571157.
Reiss, C., "Understanding Memory Configurations for In-Memory Analytics", EECS Department, University of California, Berkeley (2016).
Wu et al., "HAMR: A dataflow-based real-time in-memory cluster computing engine", Int. J. High Perform Comput. Appl. (2016).
Zaharia et al., "Resilient distributed datasets: a fault-tolerant abstraction for in-memory cluster computing", 9th USENIX conference on Networked Systems Desing and Implementation (pp. 2-22) USENIX Association (2012).

* cited by examiner $O = \{T1, T2, T3, T4, T5, T6, A1, A2, A3\}$
$E = \{e1, e2, e3, e4, e5, e6, e7, e8, e9, e10\}$

FIG. 5A

*GenCachedState(s, D, i):*     ⎯ 500

1. $s' \leftarrow copy(s)$
2. $s'.Lc[i] \leftarrow s'.Lt[i] + D[i].cc$
3. $d\_execs \leftarrow s'.Le[i] - 1$
4. $s' \leftarrow PropagateDiscountExecs(s', D, i, d\_execs))$
5. $d\_cost \leftarrow s'.Lt[i]$
6. $s' \leftarrow PropagateDiscountCost(s', D, i, d\_cost))$
7. return $s'$

FIG. 5B

*PropagateDiscountExecs(s', D, i, discount):*     ⎯ 530

1. $s'.Le[i] \leftarrow s'.Le[i] - discount$
2. for $j$ in $D[i].p$:
3.    if $s'.Lc[j] == 0$:
4.      $s' \leftarrow PropagateDiscountExecs(s', D, j, discount))$
5. return $s'$

FIG. 5C

*PropagateDiscountCost(s', D, i, discount):*     ⎯ 560

1. $s'.Lt[i] \leftarrow s'.Lt[i] - discount$
2. for $j$ in $D[i].f$:
3.    if $s'.Lc[j] == 0$:
4.      $s' \leftarrow PropagateDiscountCost(s', D, j, discount))$
5.    else:
6.      $s'.Lc[j] \leftarrow s'.Lc[j] - discount$
7. return $s'$

FIG. 7

*LocalBeamCacheSearch*($D$, $s$, *beam*, *limit*): ⎯ 700

1. *best* ← $s$
2. $O$ ← [$s$]
3. $C$ ← [ ]
4. while $O$ not empty:
5.    $s'$ ← *first*($O$)
6.    $C$ ← *append*($s'$, $C$)
7.    if *StateCost*($s'$, $D$) < *StateCost*(*best*, $D$):
8.       *best* ← $s'$
9.    $N$ ← *NewCandidate*($s'$, $D$, $C$, *beam*)
10.   $O$ ← *concat* ($O$, $N$)
11.   $O$ ← *SortByCost*($O$)
12.   $O$ ← first *limit* entries of $O$
13. return *best*

FIG. 8

*NewCandidates*($s$, $D$, $C$, *beam*): ⎯ 800

1. $G$ ← *GetCacheGain*($s$, $D$)
2. $I$ ← indexes $i$ of $G$ where $G[i] > 0$
3. $N$ ← [ ]
4. for $i$ in $I$:
5.    $s'$ ← *GenCachedState*($s$, $D$, $i$)
6.    if $s'$ not in $C$:
7.       $N$ ← *append*($s'$, $N$)
8. $N$ ← *SortByCost*($N$)
9. return first *beam* entries of $N$

AUTOMATIC PLACEMENT OF CACHE OPERATIONS FOR COMPLEX IN-MEMORY DATAFLOWS

FIELD

The field relates generally to information processing systems, and more particularly to the placement of cache operations in such information processing systems.

BACKGROUND

In some dataflows, a given action can have multiple executions during the dataflow, with various dependent transformations. To improve the performance of such dataflows, some dataflow engines provide mechanisms to persist the output of a transformation using a caching operation, thereby avoiding the re-execution of precedent operations. The caching operation indicates that the dataset produced by an operation should be kept in memory for future reuse, without the need for re-computation.

The use of a caching operation (potentially) avoids the increased cost incurred by multiple actions in a dataflow. In complex dataflows, however, comprised of tens to hundreds of operations and control flows, deciding which datasets to cache is not trivial. Thus, the decision to cache a dataset requires considerable effort from the users to estimate a number of metrics.

A need therefore exists for improved techniques for automatic placement of cache operations for such dataflows.

SUMMARY

Illustrative embodiments of the present disclosure provide methods and apparatus for automatic placement of cache operations in dataflows. In one embodiment, a method comprises obtaining a representation of a dataflow comprised of a plurality of operations as a directed graph, wherein vertices in the directed graph represent operations and edges in the directed graph represent data dependencies between the operations; determining, using at least one processing device, a number of executions of the operations, a computational cost of the operations and a computational cost of a caching operation to cache a given dataset generated by at least one of the operations based on a size of the given dataset and a cost of the caching operation, wherein the computational cost of a given operation comprises an individual cost of executing the given operation itself and an accumulated cost of additional operations required to generate an input dataset for the given operation, wherein the given operation is represented in a data structure comprising the individual cost of executing the given operation itself, the accumulated cost of additional operations required to generate an input dataset for the given operation and the computational cost of the caching operation to cache the given dataset generated by the given operation; establishing, using the at least one processing device, a dataflow state structure for each of a number of variations of caching one or more operations of the dataflow, wherein a given dataflow state structure records values for a plurality of properties of the operations in the dataflow, given zero or more existing cached operations in a given dataflow state, wherein the given dataflow state structure comprises a list of the accumulated costs of the operations in the given dataflow state, a list of the number of executions of the operations in the given dataflow state, and a list of a cache cost of the operations in the given dataflow state; determining, using the at least one processing device, for each of the dataflow states, a cache gain factor for each operation in the dataflow as an estimated reduction in the accumulated cost of the dataflow by caching an output dataset of the given operation; determining, using the at least one processing device, a change in the dataflow state structure by caching an output dataset of a different operation in the dataflow, wherein the change propagates changes in the list of the accumulated costs of the operations in the changed dataflow state structure and the list of the number of executions of the operations in the changed dataflow state structure, and applies the cache cost of the different operation to the list of the cache cost of the operations in the changed dataflow state structure; and dynamically searching, using the at least one processing device, a plurality of the dataflow state structures to automatically determine a combination of the output datasets of a subset of the operations in the dataflow to cache based on a total execution cost for the dataflow.

These and other illustrative embodiments described herein include, without limitation, apparatus, systems, methods and computer program products comprising processor-readable storage media.

BRIEF DESCRIPTION OF THE DRAWINGS

FIGS. 5A, 5B and 5C illustrate exemplary pseudo code for a GenCachedState process, and a PropagateDiscountExecs process and PropagateDiscountCost process, invoked by the exemplary GenCachedState process, according to embodiments of the disclosure;

FIG. 7 illustrates exemplary pseudo code for a LocalBeamCacheSearch process, according to an embodiment of the disclosure;

FIG. 8 illustrates exemplary pseudo code for the NewCandidates process, according to one embodiment of the disclosure.

DETAILED DESCRIPTION

Figure 1A:
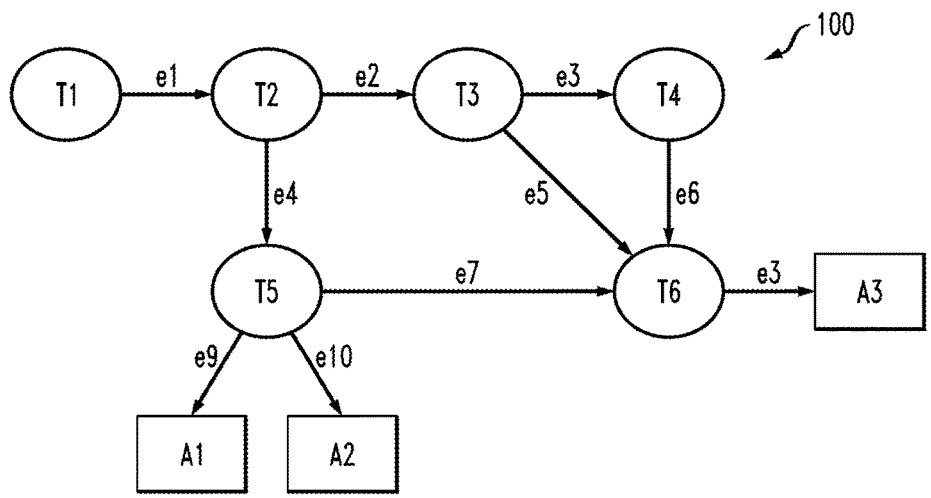
FIG. 1A illustrates an exemplary dataflow comprised of a number of transformations triggered by actions, according to one embodiment of the disclosure.

Illustrative embodiments of the present disclosure will be described herein with reference to exemplary information processing systems and associated processing devices. It is to be appreciated, however, that embodiments of the disclosure are not restricted for use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

One or more embodiments of the disclosure provide a computational approach to automatically find efficient cache placement strategies in dataflows. A formal model is provided for the cache placement problem and methods are provided for (i) domain independent estimation of dataflow performance; (ii) evaluation of cache placement options; and (iii) automatic searching for multiple cache placements.

Introduction

Large-scale data processing frameworks, such as the Spark™ data processing engine and Flink™ stream processing framework, both from the Apache Software Foundation, are currently widely adopted in the industry and academia. These frameworks employ a programming model in which the user defines a dataflow of operations that specify transformations on the input data.

These operations are lazy (or late) evaluated, as they define a logical plan that is only enacted when an action operation is executed, e.g., an operation that requires returning the results of the defined computation to the coordinating process (referred to as the driver program, in the Spark™ data processing engine).

A side effect of the lazy execution model is that dataflows with more than one action occur in multiple executions of their dependent transformations. This increases the cost of executing the dataflow substantially.

To improve the performance of dataflows running under a lazy execution model, some dataflow engines provide mechanisms to persist the output of a transformation, avoiding the re-execution of precedent operations. This is called a caching operation. In this scenario, a user informs the system about the persistence strategy by altering the persistence mode of a dataset produced by an operation.

The caching operation does not modify the lazy execution model, and merely indicates that the dataset produced by an operation should be kept in memory for future reuse, without the need for re-computation. Therefore, the use of caching operation (potentially) avoids the increased cost incurred by multiple actions in a dataflow.

However, in complex dataflows, comprised of tens to hundreds of operations and control flows, deciding which datasets to cache is not trivial. The user must consider, among others, the following metrics:

(i) the number of executions of each operation;
(ii) the computational cost of operations; and
(iii) the computational cost incurred to cache a dataset.

Thus, the decision to cache a dataset requires considerable effort from the users to estimate those metrics. Another problem is that the data size and its features (e.g., data types and cardinalities) impact on the costs of operations, requiring the user to estimate the datasets characteristics at design time. Related to this issue, when deciding which datasets are meant to be cached, the user also needs to have in mind the memory limitations to avoid unnecessary disk access. Finally, aiming at improving the dataflow performance, it is possible to cache multiple datasets. Therefore, the decision involving multiple datasets to be cached becomes a combinatorial problem.

One or more embodiments of the disclosure provide for the automatic placement of cache operations in complex dataflows. The term cache placement refers to the decision of which operation results to cache. To achieve this goal, a formal model is defined in a section entitled "A Formal Model for the Cache Placement Problem" for the representation of dataflows. Mathematical models are defined in a section entitled "Estimation Functions," for the estimation of properties of the dataflow. A section entitled "Cache Gain Factor Computation" describes a metric for the potential benefits of caching operations. An algorithm is provided in a section entitled "Automatic Search for Multiple Cache Placement," for the search of the substantially best strategy for cache placement.

In large-scale data analysis, keeping data in memory increases the processing speed significantly. In contrast to the on-disk approach, in-memory processing frameworks eliminate disk operations by maintaining intermediate data in memory. This execution model is adopted for a variety of reasons, and may lead to better computation resource usage while avoiding disk I/O (input/output) overhead. See, for example, Y. Wu et al., "HAMR: A Dataflow-Based Real-Time In-Memory Cluster Computing Engine," Int. J. High Perform. Comput. Appl. (2016), incorporated by reference herein in its entirety.

Current in-memory frameworks provide a programming model in which the user creates a dataflow defining a set of operations over the input data. Most frameworks classify operations in two categories: transformations and actions. Transformations are lazy operations that produce new datasets, while actions launch a computation that returns a value to the coordinating program. The lazy evaluation of transformations implies that their execution is delayed until demanded by an action.

To improve the performance of a dataflow under the lazy execution model, a user can set the persistence mode of a dataset produced by a transformation through the cache operation. This operation leads to the in-memory storage of the dataset produced by the associated transformation. By doing so, the associated transformation (and all the ones preceding it in an execution path) are executed only once, instead of once for each action following that transformation.

Example

Consider an example that exemplifies the cache placement problem. The example assumes a workflow defined using the Apache Spark™ framework. The example may, however, be mapped to other in-memory dataflow frameworks by a person of ordinary skill in the art. FIG. 1A illustrates an exemplary dataflow 100 comprised of six transformations (labeled T1 through T6) that are triggered by three actions (labeled A1 through A3), according to one embodiment of the disclosure. The directed edges in the dataflow 100 represent the dependencies between the datasets produced and/or consumed by the operations. For example, the dataset produced by transformation T2 is consumed by transformations T3 and T5, while the dataset produced by transformation T5 is consumed by the transformation T6 and by the actions A1 and A2. The following table details the dataflow operations. Notice that the example of FIG. 1A is not meant to represent a real application scenario, it is indeed a didactic example for explaining the aspects of the present disclosure. Dataflows in real applications typically configure larger and more complex graphs.

| | Operation | Description |
|---|---|---|
| Transformations | Project | Returns a dataset with selected columns |
| | Select | Projects a set of expressions and returns a new dataset |
| | Filter | Returns a dataset with rows filtered by predicate |
| | Sort(asc) | Returns a dataset with rows in ascending order by key |
| | Sort(desc) | Returns a dataset with rows in descending order by key |
| Actions | Union All | Returns a merged dataset from two or more other datasets |
| | Count | Returns the number of rows of a given dataset |

Intuitively, the dataset (or datasets) that are most reused by succeeding transformations and actions are the best candidates to be cached. Considering this criterion, in the dataflow of FIG. 1A, datasets ds1 or ds2, produced by transformations T1 and T2, respectively, are promising candidates. Another intuitive strategy is to cache the datasets produced by transformations that are closer to the actions, thus avoiding the re-execution of (many) previous transformations in their execution path. Based on this strategy, the best dataset to cache would be ds5, produced by transformation T5.

To analyze whether such an intuition is correct or not, consider an experiment using as input a dataset containing customer ratings for products in a retail setting. The dataset consists of nearly three million rows with a total size of 1.4 GB. The dataflow was executed in a machine with 96 GB RAM (random access memory) memory and a 32-core processor. The selected dataflow execution framework was Apache Spark™ version 1.6.2, in standard configuration. The performance improvement of using caching operations is calculated by computing the difference between the elapsed-time needed to run the dataflow without any cached dataset and the elapsed-time to run the dataflow with different combinations of cached datasets. The candidate datasets for caching are the ones generated by transformations T1, T2, T3 and T5, since these datasets are requested by more than one action in the dataflow. Note that in a lazy execution model, a dataset participating in more than one path of transformation to an action will be requested multiple times. For example, dataset ds1 will be requested three times by action A3, in the running example, as well as once by action A1 and once by action A2.

The total time to run the dataflow without cache was 113.09 seconds. The following table shows the performance results when caching different datasets, where dsi denotes the dataset ds generated by the transformation Ti.

| Spark local configuration: driver memory 48 GB; executor instances 32; executor memory 10 GB; maxResultSize 20 GB | | |
|---|---|---|
| Cache placement | Execution time (s) | Time Reduction (%) |
| cache ds1 | 46.60 | 58.8 |
| cache ds2 | 46.33 | 59.0 |
| cache ds3 | 46.69 | 58.7 |
| cache ds5 | 70.98 | 37.2 |
| cache ds1 and ds2 | 48.54 | 57.1 |
| cache ds1 and ds3 | 47.91 | 57.6 |
| cache ds1 and ds5 | 35.75 | 68.4 |
| cache ds2 and ds3 | 47.89 | 57.7 |
| cache ds2 and ds5 | 36.19 | 68.0 |
| cache ds3 and ds5 | 35.39 | 68.7 |

The experiment indicates that, caching dataset ds5 alongside either dataset ds1, ds2 and ds3 are generally good options. The substantially best results are obtained by the caching of datasets ds3 and ds5. It is important to point out that caching only dataset ds5 (a promising option according to the aforementioned intuitive notions) does not provide considerable time reduction. The example illustrates that, even in a simple dataflow, finding the best cache placement is a non-trivial task. Considering complex dataflows, comprised of tens to hundreds of operations and control flows, this task is even more challenging.

Cache Placement for Complex Dataflows

In the current programming model of in-memory dataflow frameworks, the decision to cache datasets produced by transformations is a manual activity performed by the users. However, as described above in the running example, this decision is hard, even more so when the dataflow involves various transformations and actions, and/or includes loops or iterations, on which the operations may access only a fragment of the data, or when each iteration may require data generated by the previous one. In summary, the cache placement must consider:

(i) the number of enactments of each transformation: The estimation of the number of invocations of a transformation involves considering the structure of the dataflow graph, which requires a considerable amount of effort and expertise from users in complex cases.

(ii) the computational cost of transformations: Each transformation has a specific algorithmic cost to produce a dataset and also an accumulated cost considering the execution path required to generate the input datasets. When analyzing the substantially best cache placement, both computational costs (individual and accumulated) must be considered. To infer such costs at design time is not trivial.

(iii) the computational cost to cache the dataset: The cache operation incurs a computational cost, which is related to the size of the dataset to be cached. The user needs to consider whether caching a dataset is costlier than the transformation that produces it.

Therefore, the decision to cache a dataset requires considerable effort to estimate, at design time, the number of operation executions, the computational cost of transformations (individual and accumulated), and the computational cost to cache the produced datasets.

Data Size and Data Features Impact on Dataflow Performance

To perform analysis on large datasets, a user defines a dataflow that processes input data along a set of operations. The computational cost of each operation is significantly affected by the size of the data, its structure, cardinality and the way it is partitioned on the distributed file system. Consequently, the dataflow execution performance depends on the size and features of both input and output datasets that are manipulated by the intermediate transformations during the dataflow execution.

In complex dataflows, comprised of many transformations and control flows, each one having several input datasets with different sizes and features, a manual analysis at design time of the dataflow performance is not feasible. In this scenario, efficient strategies for estimating the dataflow performance are a relevant problem that needs to be addressed.

Multiple Cache Placements

In a complex dataflow, multiple datasets are candidates for caching. The optimal cache placement strategy may involve the caching of multiple datasets, configuring a combinatorial problem.

Considering dataflows comprised of a large number of operations, the decision of which datasets to cache becomes unfeasible to perform manually. Given that caching heavily influences the execution cost of a dataflow, there is an evident need for an automatic approach to define optimal or near-optimal cache placement.

Memory Constraint

In-memory computing frameworks keep intermediate processed data in memory, by default. However, if there is not enough RAM (random access memory), frameworks spill the data to disk, which reduces the dataflow performance drastically. Therefore, limited RAM memory is a constraint that must be considered when analyzing cache placement, since a cached dataset occupies memory space. For multiple cache placements, when adding a new cache, the user needs to deal with previously cached datasets, aiming at not including unnecessary disk I/O (input/output) overhead.

Another issue related to this constraint is that the majority of in-memory computing frameworks are written in a garbage-collected language. See, for example, M. Zaharia et al., "Resilient Distributed Datasets: A Fault-Tolerant Abstraction for In-Memory Cluster Computing," $9^{th}$ USENIX Conf. on Networked Systems Design and Implementation, 2-22 (2012), incorporated by reference herein in its entirety. Garbage collection achieves reasonable performance by collecting garbage in large batches; consequently, the memory usage for the temporary storage of garbage must also be taken into account. See, for example, C. Reiss, "Understanding Memory Configurations for In-Memory Analytics," (University of California, Berkeley, EECS Department; 2016), incorporated by reference herein in its entirety.

Automatic Cache Placement

A formal model is initially defined for the representation of the dataflow, which lends itself to the description of the disclosed methods for the estimation of the number of executions and costs of operations and the automatic search for the best cache placement strategy.

A Formal Model for the Cache Placement Problem

A dataflow is represented as a graph where the vertices are the operations and the edges represent the data dependencies between them. A dataflow graph G is defined as a tuple $G=(O, E)$, where $O=\{o_1, o_2, \ldots, o_n\}$ is a collection of operations, and $E=\{e_1, e_2, \ldots, e_m\}$ is the set of directed edges. Operations are either of type transformation or of type action. Actions are the operations that kick-start the actual execution in the lazy evaluation model, and are defined to not have any subsequent operations. Referring back to FIG. 1A, actions are represented by square nodes and transformations are represented by round nodes, and the collection of operations, O, and the set of directed edges, E, are shown.

Figure 1B:
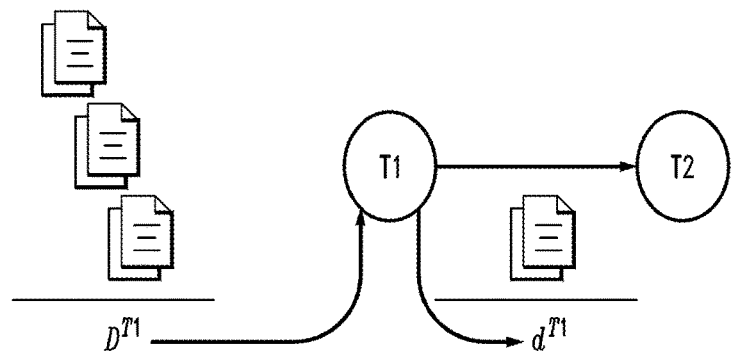
FIG. 1B illustrates an example of a transformation operation having an input dataset and an output dataset, according to an embodiment of the disclosure.

An operation $o \in O$ receives a set $D^o$ of datasets as input, executes an algorithm over it, and produces a dataset $d^o$. FIG. 1B illustrates an example of a transformation operation, T1, with an input dataset $D^{T1}$ and an output dataset $d^{T1}$, according to one embodiment of the disclosure. In the case of action operations, the output dataset typically consists of one or more of a plurality of textual, scalar or numerical values to be persisted on disk.

Figure 1C:
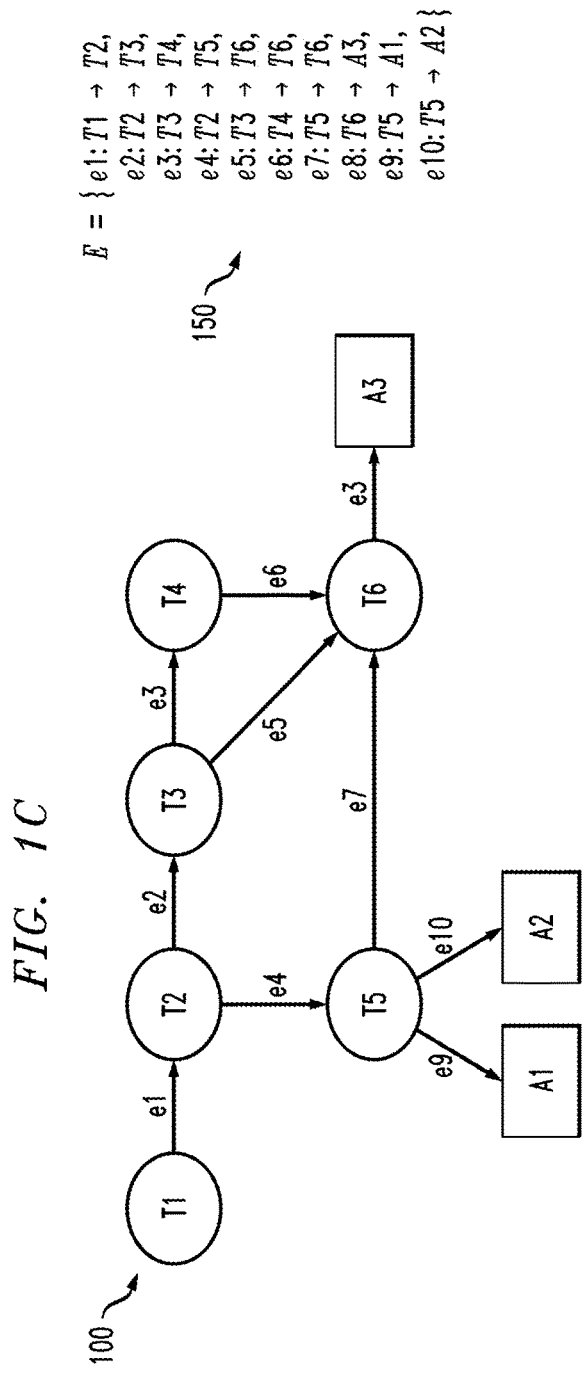
FIG. 1C comprises a table illustrating the edges of the dataflow of FIG. 1A using a relationship dependency format, according to one embodiment of the disclosure.

Each edge $e:(p \rightarrow f) \in E$ denotes a dependency between two operations p, $f \in O$. Operation f is dependent on an operation p when the dataset $d^p$ produced by p is an input to f. Thus, f can only be executed after the execution of p. FIG. 1C comprises a table 150 illustrating the edges e1-e10 of the dataflow 100 of FIG. 1A using this relationship dependency format, where edges represented as relationship dependences between operations, according to one embodiment of the disclosure.

Each operation $o \in O$ has a set of properties $p^o$:

$$p^o=\{type, num\_executions, cost\_individual, cost\_total, cost\_cache, cached\}.$$

When a dataflow is defined, the type of the dataflow is the only known property of each operation. A set of all actions is defined as $A=\{a \in O | a.type=action\}$ and a set of all transformations is defined as $T=\{t \in O | t.type=transformation\}$, with $A \cap T=\emptyset$.

The property num_executions holds the number of required executions of an operation. This property is directly related to the number of possible paths from the operation until the leaves of the graph (the number of possible operation paths, as described in a section entitled "Number of Executions.").

The cost properties cost_individual, cost_total and cost_cache represent different computation costs associated to the execution of the operation:
- the individual cost cost_individual is the cost of executing the operation itself;
- the total cost cost_total is the accumulated cost, considering the execution path of required operations to generate the operation's input dataset; and
- the cache cost cost_cache denotes the computational cost to persist the output dataset of the operation, which is related to the size of this dataset.

The cached property holds the information necessary for the cache placement strategy to be enacted. The cached property can be either true or false, defining whether the dataset produced by the operation is meant to be cached. For ease of explanation, "caching a dataset produced by an operation" is referred to interchangeably as "caching an operation" in the remainder of this document.

For a given operation $o \in O$, the following is additionally defined:

$$P^o=\{p \in T | \exists e:(p \rightarrow o) \in E\},$$

as the set of transformations (no actions) directly preceding o, required and sufficient for the generation of all $d \in D^o$. Similarly, the following is also defined:

$$F^o=\{f \in O | \exists e:(o \rightarrow f) \in E\},$$

as the set of operations (including actions) that directly follow o, i.e., operations that require $d^o$ as input. For example, in the graph 100 of FIG. 1C, $P^{T2}=\{T1\}$ given by edge e1, and $F^{T2}=\{T3, T5\}$, given by edges e2 and e4, respectively. Notice that since action operations are defined to not have any subsequent operations, set $F^a=\emptyset$ for all $a \in A$.

Finally, the problem of cache placement is defined for a complex dataflow as how to automatically assign a value for the cached property of each operation typed as a transformation in the dataflow, taking into account (i) the impact of data size and its features on the dataflow performance, (ii) the possibility of multiple cache placements, and (iii) memory constraints. This assignment should substantially minimize the execution cost for the dataflow as a whole. An algorithm that addresses the automatic assignment of cache operations (cache placement) is described in the section entitled "Automatic Search for Multiple Cache Placement." The algorithm relies on the other properties of the operations as input, which are computed through the estimation functions described in the following section.

Estimation Functions

In this section, the functions for the estimation of the number of executions and costs of operations are described. This corresponds to the assignment of values for the num_executions, cost_individual, cost_total and cost_cache properties for each operation in the dataflow. Based on these values, the total dataflow cost metric is defined.

A. Number of Executions

The number of executions of a given operation is determined by the number of execution paths in which the operation appears. Therefore, the number of executions of a transformation $o_i \in T$ is defined as the number of paths from the transformation to each action operation. Assuming a function NumPaths($o_i$, $o_j$) which gives the number of paths between $o_i$ and $o_j$:

$$o_i.\text{num\_executions}=\Sigma_{o_j \in A}\text{NumPaths}(o_i,o_j).$$

A path from an operation to another operation is a sequence of operations that establishes a transitive dependency relationship between these two operations. All actions are executed just once, and the number of paths from an action to itself is defined as 1.

Figure 2A:
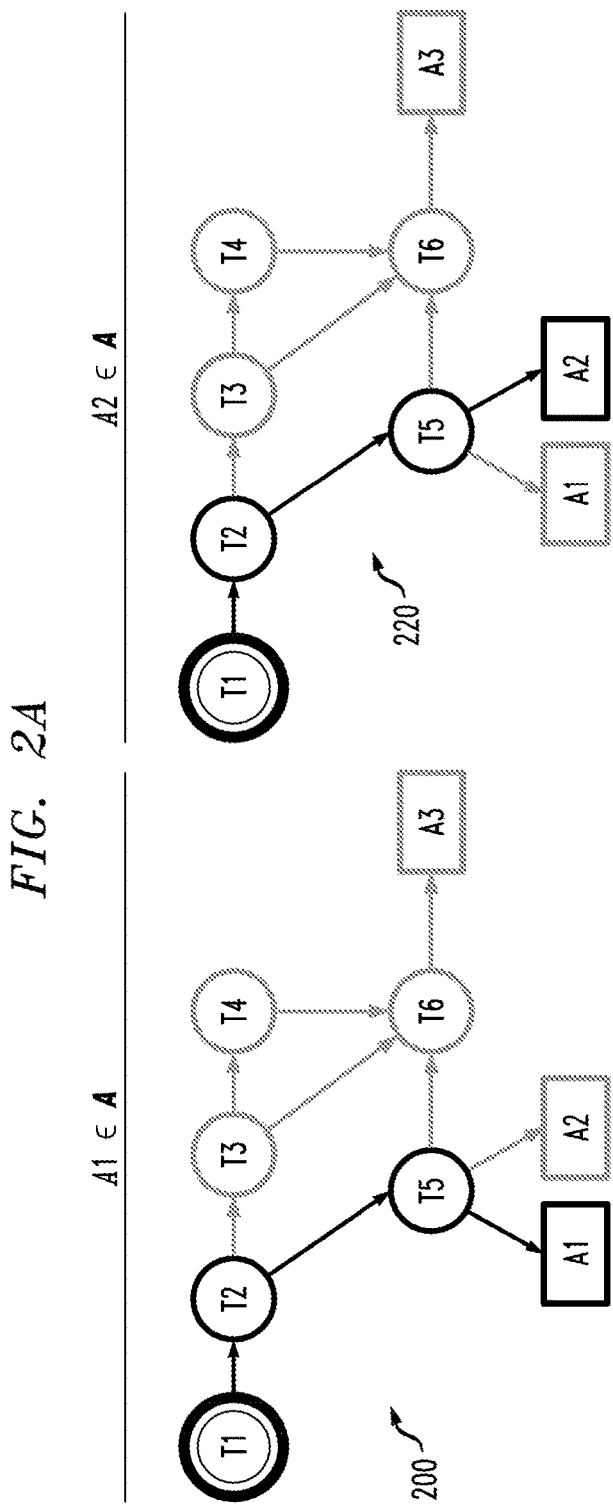
FIGS. 2A through 2C illustrate a number-of-executions property for the operations of the dataflow of FIG. 1A, according to embodiments of the disclosure.
Figure 2B:
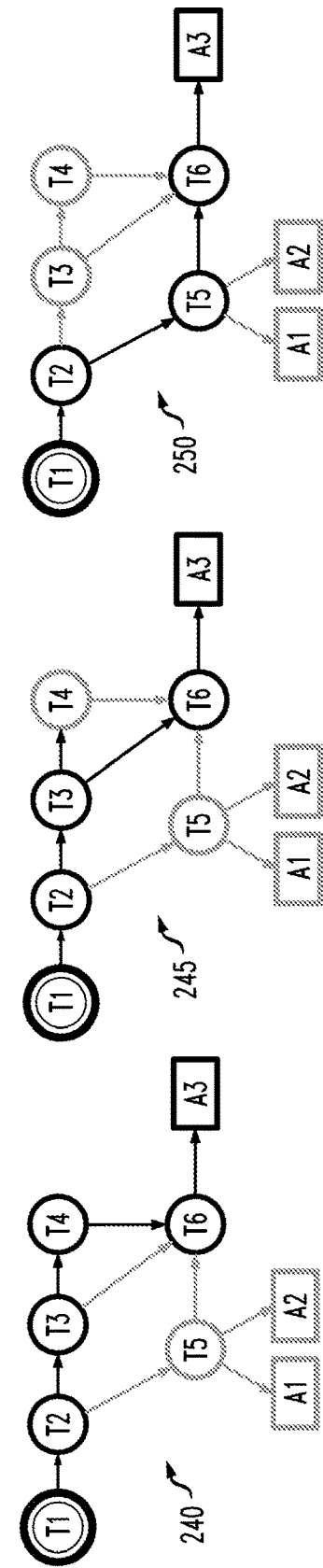
Figure 2C:
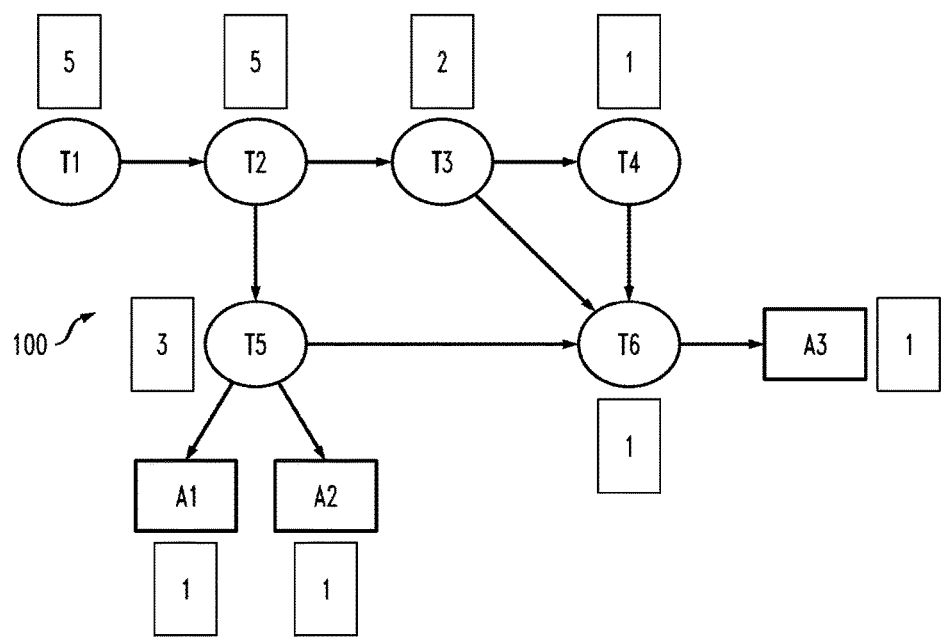

FIGS. 2A through 2C illustrate a number of executions property for the operations of the dataflow 100 of FIG. 1A, according to one embodiment of the disclosure. FIGS. 2A and 2B comprise a graphical representation of the computation of the num_executions property for transformation T1 in the running example. FIG. 2A illustrates the computation of the number of executions of transformation T1, considering a path in graph 200 from T1 to A1 and a path in graph 220 from T1 to A2. In the example of FIG. 2A, NumPaths (T1, A1)=1 and NumPaths(T1, A2)=1.

FIG. 2B illustrates the computation of the number of executions of transformation T1, considering three different paths 240, 245, 250 from T1 to A3. In the example of FIG. 2B, NumPaths(T1, A3)=3.

FIG. 2C illustrates the example dataflow 100 of FIG. 1 with the num_executions property annotated for each operation in the dataflow 100.

B. Execution Cost

As mentioned above, the computational cost of each operation $o_i$ is affected by the size, structure, and cardinality of its input datasets $D^{o_i}$. Provenance models can provide estimations for these characteristics of the input datasets for all operations in the dataflow. Approaches and techniques which could provide such models based on provenance data are described, for example, in U.S. patent application Ser. No. 14/580,732, now U.S. Pat. No. 10,013,656, filed Dec. 23, 2014, entitled "Method and Apparatus for Analytical Processing of Provenance Data for HPC Workflow Optimization," and U.S. patent application Ser. No. 15/191,755, filed Jun. 24, 2016, entitled "Methods and Apparatus for Data Pre-Processing in Dataflow Operations," each incorporated by reference herein in its entirety.

Assuming that such models provide a function OperationCost($o_i$, D) which estimates the computational cost of operation $o_i$ given the initial input datasets of the dataflow D, the property cost_individual of that operation is determined as follows:

$$o_i.\text{cost\_individual}=\text{OperationCost}(o_i,D).$$

The computational cost is an abstraction of the execution time of an operation in a given context. In this disclosure, brief experiments were performed for provenance collection of the cost of individual operations.

Figure 3:
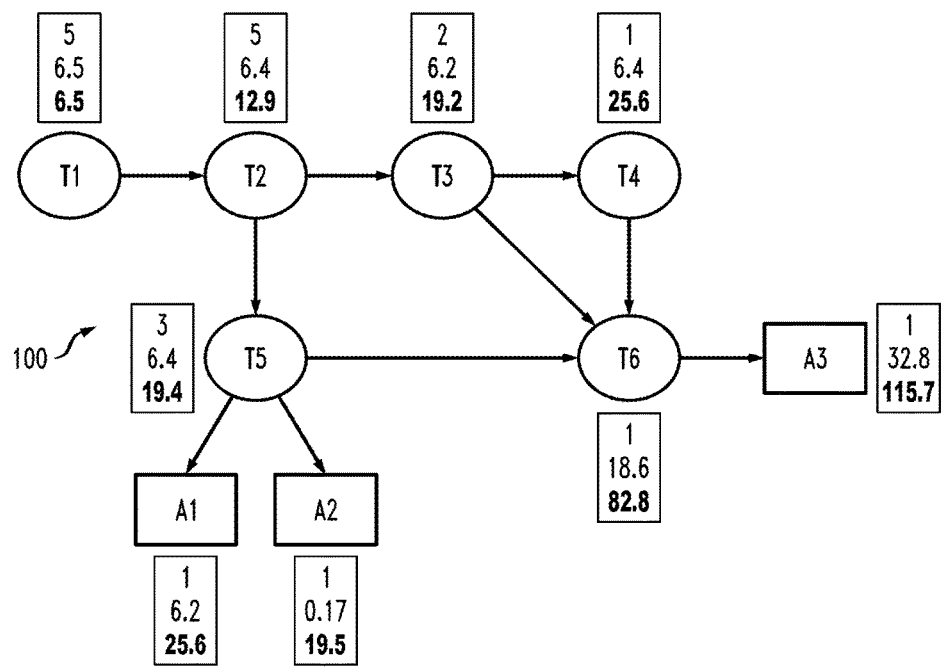
FIG. 3 illustrates a computational cost property for operations of the exemplary dataflow of FIG. 1A, according to one embodiment of the disclosure.

FIG. 3 illustrates a computational cost property for operations of the exemplary dataflow 100 of FIG. 1A, according to one embodiment of the disclosure. FIG. 3 indicates the num_executions property annotated for each operation in the dataflow 100, in the first row of the vertical array for each operation, as in FIG. 2C. In addition, FIG. 3 also indicates the individual cost and total cost of each application in the second and third rows, respectively, for each operation, as discussed further below.

Thus, FIG. 3 builds upon the previous example of FIG. 2C to show the associated estimated costs for each operation in the running example dataflow. The individual cost of an operation may consider factors that affect the computational performance of the operation, such as resource requirements (memory, IO throughput, etc.) and failure rates.

The total cost of an operation $o_i \in O$ is the accumulated cost of all previous operations required to generate the input datasets D. Therefore, the total cost of an operation $o_i$ is given by:

$$o_i.\text{cost\_total}=o_i.\text{cost\_individual}+\Sigma_{o_j \in P^{o_i}}o_j.\text{cost\_total},$$

where $P^{o_i}=\{p \in T | \exists e:(p \rightarrow o_i) \in E\}$ is the set of transformations directly preceding $o_i$.

C. Cache Cost

The cache operation has a computational cost proportional to the time necessary to perform the caching, which is dependent on the size of the dataset. Cached datasets occupy potentially large chunks of memory, and this occupied memory is no longer available for the computation of following operations. Thus, the cache cost, like the execution cost, represents an abstraction of both execution time and of the relation between the necessary and available resources (in this case, specifically, the required and available memory) for the execution of the dataflow.

In a similar manner as the computation cost of an operation, this size can be estimated by models built from provenance data before the operation is executed. Approaches and techniques which could provide such models are described in the patent applications referenced above.

Formally, caching the results of operation $o_i$ incurs a cost that is proportional to the size of $d^{o_i}$, the dataset generated by $o_i$, and to the cost of the caching operation. Assuming that such models provide a function CachingCost($o_i$, D) which estimates the cost of caching $d^{o_i}$ given the initial input datasets of the dataflow D, the property cost_cache of operation $o_i$ is determined as follows:

$$o_i.\text{cost\_cache}=\text{CachingCost}(o_i,D).$$

In the running example, it is assumed, from experiments for provenance collection with a 1.4 GB dataset, a cache cost of 1.57 for each transformation; except for transformation T6 whose cache costs 5.09, which results from the larger, and more cache expensive, dataset generated by transformation T6.

D. Dataflow Cost

Operations with type action are dataflow leaf nodes whose total cost represents the cost of all its execution paths. Therefore, the total dataflow cost is defined as follows:

$$\sum_{a \in A} a \cdot \text{cost\_total}.$$

The cost of a dataflow G assumes that the total cost of all actions a∈A are already estimated. In the running example, the total dataflow cost is 25.6+19.5+115.7=160.79, from actions A1, A2 and A3, respectively.

Cache Gain Factor Computation

The cache gain factor of a given transformation is defined as the potential decrease, in the total cost of the dataflow, from caching the output dataset of the given transformation. This concept is useful for the automatic computation of the substantially best combination of cache placements, described in the following sections, and also configures a naïve solution for a single cache placement: caching the operation with the highest immediate cache gain.

The following method is provided for the computation of the cache gain factor of a transformation t. The method relies on the estimation functions described above:

CacheGain(t)=((t.num_executions−1)*t.cost_total)−t.cost_cache).

The reasoning for this definition, in one or more embodiments, is as follows. The caching of a given transformation's output dataset $d^t$ will spare its re-execution t.num_executions−1 times. Thus, the total cost of the dataflow will potentially decrease by the total cost of the operation t.cost_total multiplied by the number of spared re-executions.

Finally, consider the computational cost of the caching itself, as well as the impact of keeping the resulting dataset in memory for future computations. This is done through the estimation function t.cost_cache. This value is subtracted from the potential gain from caching the operation so that transformations with highly costly caches (either computationally or due to very large outputs) are disfavored.

Overall, the exemplary algorithm identifies the best potential caches in costly transformations whose outputs are reused many times and whose memory footprint is relatively smaller. This motivates the use of the cache gain factor as a straightforward heuristic in the automatic search for the best combination of cache placements, described in the following section.

The following table shows the estimated cache gain factor for each transformation in the running example dataflow 100, ranked from greatest to lowest.

$CacheGain(T2) = ((5-1) * 12.9) - 1.57 = 50.2$ $CacheGain(T5) = ((3-1) * 19.4) - 1.57 = 37.2$ $CacheGain(T1) = ((5-1) * 6.5) - 1.57 = 24.6$ $CacheGain(T3) = ((2-1) * 19.2) - 1.57 = 17.6$ Recall that operations T4 and T6 are executed just once in the dataflow 100, and therefore are not considered as options for caching in the above table.

Automatic Search for Multiple Cache Placement

In this section, the method for the automatic search for the substantially best combination of multiple cache placements in a dataflow is described. This corresponds to the automatic assignment of a value for the cached property of each transformation in the dataflow.

Since the caching of any one operation effectively modifies the properties of the other operations that dictate the cost of the dataflow, this configures a combinatorial problem. To this end, a method for the automatic search for multiple cache placements is provided.

The disclosed method relies on the concepts described in previous sections. Initially, the data structures that support the method are defined, which were designed for one or more embodiments with the efficiency of the search process in mind. Algorithms are also disclosed that implement the methods for updating the properties of an operation given one or more cache placements, and for the heuristic search of the best cache placements.

A. Dataflow List

Recall the definition of the dataflow as a graph G=(O, E), with a set of operations O={$o_1, o_2, \ldots, o_n$} and directed edges E. As mentioned above, the type of an operation is known a priori. Thus assume, for ease of explanation, an implicit ordering such that the first k operations are transformations, i.e., $o_1, \ldots, o_k \in T$, and the remaining operations are actions, i.e., $o_{k+1}, \ldots, o_n \in A$, for 0≤k<n. For the purpose of the disclosed methods, the relevant information of the dataflow is stored in a list, as follows:

$$\mathbb{D} = [t_1, t_2, \ldots, t_k, t_{k+1}, t_{k+2}, \ldots, t_n].$$

where $t_i$, 1≤i≤n is a tuple representing the corresponding operation $o_i \in O$. Each such tuple is of the following format:

$t_i = (p, f, ci, ct, cc)$.

This tuple roughly corresponds to the set of properties of an operation, as described in the section entitled "A Formal Model for the Cache Placement Problem," except for the type and cached properties. While obtaining a value for the cached property is a goal of the disclosed method, the type property does not need to be defined since it is implicit in the ordering in $\mathbb{D}$. The list representation of the dataflow 100 of FIG. 1A in the running example is as follows:

$\mathbb{D} = [t_1 = ([\ ],\quad [2],\quad 6.5,\quad 6.5,\quad 1.57),$ $\quad t_2 = ([1],\quad [3, 5],\quad 6.4,\quad 12.9,\quad 1.57),$ $\quad t_3 = ([2],\quad [4, 6],\quad 6.2,\quad 19.2,\quad 1.57),$ $\quad t_4 = ([3],\quad [6]\quad\quad 6.4,\quad 25.6,\quad 1.57),$ $\quad t_5 = ([2],\quad [6, 7, 8],\ 6.4,\quad 19.4,\quad 1.57),$ $\quad t_6 = ([3, 4, 5],\ [9],\quad\ 18.6,\quad 18.8,\quad 5.09),$ $\quad t_7 = ([5],\quad [\ ],\quad\quad 6.2,\quad 25.6,\quad 0),$ $\quad t_8 = ([5],\quad [\ ],\quad\quad 0.17,\quad 19.5,\quad 0),$ $\quad t_9 = ([6],\quad [\ ],\quad\quad 32.8,\quad 115.7,\quad 0)]$ Fields ci, ct and cc correspond to the cost_individual, cost_total and cost_cache properties, respectively. These costs of the operations are obtained by the estimation functions described above.

Fields p and f are lists containing the indexes in $\mathbb{D}$ of elements in $P^{o_i}$ and $F^{o_i}$, respectively.

Figure 4:
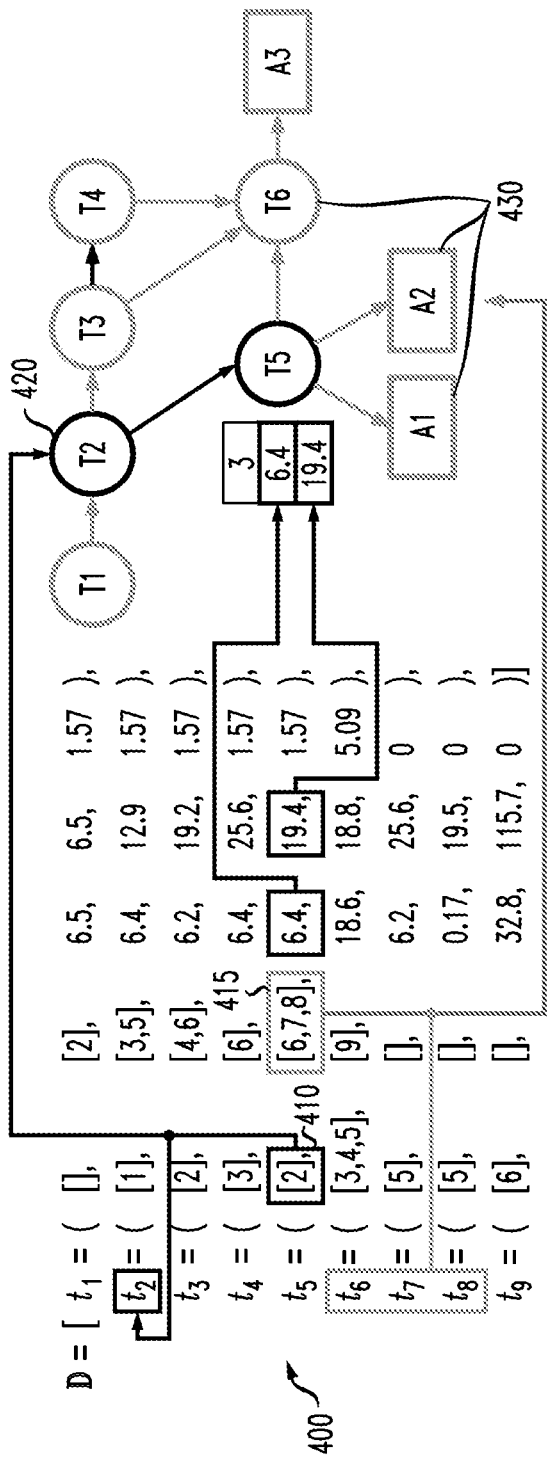
FIG. 4 illustrates a correspondence of a transformation in an exemplary dataflow list, according to an embodiment of the disclosure.

FIG. 4 illustrates a correspondence 400 of transformation T5, the $5^{th}$ tuple of an exemplary dataflow list $\mathbb{D}$, according to one embodiment of the disclosure. The first field $t_5.p$ 410 and the second field $t_5.f$ 415 of the tuple are indexes of the operation 420 preceding T5 and of the operation 430 following T5, respectively. The individual and total costs for operation T5 correspond to field $t_5.ci$ and $t_5.ct$, respectively (in the third and fourth fields of the selected tuple).

Take, in the example in FIG. 4, tuple $t_2$, which corresponds to operation T2. The set of preceding operations $P^{T2}=\{T1\}$ becomes field p in the tuple. Since T1 corresponds to $t_1$ in $\mathbb{D}$, $t2.p=[1]$. Conversely, the set of operations following T1 is $P^{T1}=\{T2\}$, and therefore $t_1.f=[2]$.

Formally, this means that if an edge $e:(o_i \rightarrow o_{i+1})$ exists in E, the list entry for $t_{i+1}.p$ will contain the index (i) (i.e., the operation represented by the i-th element of $\mathbb{D}$ is a preceding operation to $o_{i+1}$). Conversely, the list entry $t_i.f$ will contain (i+1), meaning that the i+1-th element of $\mathbb{D}$ is a tuple-representation of an operation that follows $o_i$.

In the exemplary algorithms described below, the dataflow list structure is a static representation of the dataflow graph and the initial values of the properties of the operations. It is defined once and remains unchanged for the execution of the method.

B. Dataflow State For the dynamic handling of the cache placements, the state data structure is defined. A state holds the current values for the properties of the operations given zero or more cached transformations already established. The state where zero transformations are cached is called the initial state of the dataflow, in which the values of all operation properties are identical to their values in the dataflow list $\mathbb{D}$. The states that represent the dataflow with one or more cached operations, however, hold different values for properties of one or more operations.

The state structure supports both the update of operation properties and the search methods. A state is represented with a minimal structure, in one or more embodiments, since it may be necessary to hold many such states in memory for the search.

A state S is a tuple of the form:

$$S=(Lt, Le, Lc),$$

where Lt, Le and Lc are lists of the same length as $\mathbb{D}$ and:
- Lt is a list of the total costs cost_total of the operations in the state, such that the i-th element of Lt represents the total cost for operation $t_i$ in $\mathbb{D}$;
- Le is a list of the number of executions num_executions of the operations in the state, such that the i-th element of Le represents the number of executions for operation $t_i$ in $\mathbb{D}$; and
- Lc is a list of the applied caching costs of the operations in the state, such that the i-th element of Lc represents the applied cache costs for operation $t_i$ in $\mathbb{D}$. The applied cache cost of an operation is either zero, when it is not cached in that state, or its cost_cache plus the cost_total of the operation, when the operation is cached.

As previously mentioned, the initial state is a different representation of the initial values of the properties of the operations in $\mathbb{D}$. The following array indicates the initial state for the running example dataflow 100:

$$Lt = [6.5, \quad 12.9, \quad 19.2, \quad 25.6, \quad 16.4, \quad 18.8, \quad 25.6, \quad 19.5, \quad 115.7]$$
$$Le = [5, \quad 5, \quad 2, \quad 1, \quad 3, \quad 1, \quad 1, \quad 1, \quad 1]$$
$$Lc = [0, \quad 0, \quad 0, \quad 0, \quad 0, \quad 0, \quad 0, \quad 0, \quad 0]$$

It is noted that in the initial state, no caches have been placed and therefore Lc is a list of zeroes. In the discussion herein, cached operations are identified by the fact that they have a non-zero applied caching cost in Lc.

With this at hand, the state cost is defined as the dataflow cost (the sum of the cost_total for the actions, as described above) plus the summation of all values in Lc. This represents that the total cost of the dataflow with a certain number of applied caches is the cost of the actions in that context plus the cost of performing the caching operations themselves.

C. Cache Placement and Propagation of Operation Properties

FIG. 5A illustrates exemplary pseudo code for a GenCachedState process 500, according to one embodiment of the disclosure. Generally, the GenCachedState process 500 handles the change of state when a cache is placed. In one or more embodiments, the process 500 propagates the changes in the total costs and in the number of executions by creating a new state with new Lt and Le lists, respectively, as well as applying the cost of the cached operation to the respective element in Lc.

As shown in FIG. 5A, the exemplary GenCachedState process 500 receives as arguments a state s, the dataflow list $\mathbb{D}$ and the index i of a transformation in $\mathbb{D}$ to cache. A copy s' of the state is created (line 1) and updated before being returned.

First, (line 2) the new state's applied cache costs is updated to reflect the caching of the operation indexed by i.

Assume, in the running example, a call to the algorithm for the caching of operation T5, with i=5, from the initial state, s. Recall that the cache cost for transformation T5 is 1.57; and that the total cost of T5 in the initial state is 16.4. The applied cache cost for T5 in the resulting state s' is therefore 1.57+16.4=17.97. After this step, state s' is as follows, with the change in the applied cache cost highlighted with boldface text:

$$Lt = [6.5, \quad 12.9, \quad 19.2, \quad 25.6, \quad 16.4, \quad 18.8, \quad 25.6, \quad 19.5, \quad 115.7]$$
$$Le = [5, \quad 5, \quad 2, \quad 1, \quad 3, \quad 1, \quad 1, \quad 1, \quad 1]$$
$$Lc = [0, \quad 0, \quad 0, \quad 0, \quad \mathbf{17.97}, \quad 0, \quad 0, \quad 0, \quad 0]$$

The exemplary GenCachedState process 500 then updates the number of executions and the total costs for other operations in that state (lines 3-6). This process starts by assigning to variable d_execs the number of executions of the transformation to be saved by the caching (line 3). In the running example of the caching of T5, d_execs=2.

The value state s', generated by the exemplary GenCachedState process 500, is then passed (in line 4) as part of the arguments to an auxiliary algorithm, the PropagateDiscountExecs process 530, as discussed further below in conjunction with FIG. 5B. The state s' is replaced by the result to this call.

Similarly, a difference of the total execution cost for the cached transformation is taken as variable d_cost (line 5) and passed (in line 6) to a similar auxiliary algorithm, the PropagateDiscountCost process 560, as discussed further below in conjunction with FIG. 5C.

FIG. 5B illustrates exemplary pseudo code for the PropagateDiscountExecs process 530, invoked by the exemplary GenCachedState process 500 of FIG. 5A, according to one embodiment of the disclosure. Semantically, the exemplary PropagateDiscountExecs process 530 is used to update a state's number of executions list Le recursively. The exemplary PropagateDiscountExecs process 530 receives as arguments a state s', the dataflow list $\mathbb{D}$, the index of an operation i and the discount to apply to the number of executions of that operation. The exemplary PropagateDiscountExecs process 530 updates the received state and returns it.

As shown in FIG. 5B, the exemplary PropagateDiscountExecs process 530 starts by applying the discount to operation i in Le (line 1). Recall the running example, where an initial call to PropagateDiscountExecs 530 is made with state s, i=5 and discount=2. After this step (line 1), the updated state s', with an updated number of executions for operation T5, is as follows.

$$Lt = [6.5, \quad 12.9, \quad 19.2, \quad 25.6, \quad 16.4, \quad 18.8, \quad 25.6, \quad 19.5, \quad 115.7]$$
$$Le = [5, \quad 5, \quad 2, \quad 1, \quad 1, \quad 1, \quad 1, \quad 1, \quad 1]$$
$$Lc = [0, \quad 0, \quad 0, \quad 0, \quad 17.97, \quad 0, \quad 0, \quad 0, \quad 0]$$

In the sequence, the algorithm 530 updates s' with the result of a recursive call (line 4) for each operation preceding i (line 2) which is not cached (line 3). The resulting state from the chain of recursive calls in the running example is represented below:

$$Lt = [6.5, \quad 12.9, \quad 19.2, \quad 25.6, \quad 16.4, \quad 18.8, \quad 25.6, \quad 19.5, \quad 115.7]$$
$$Le = [3, \quad 3, \quad 2, \quad 1, \quad 1, \quad 1, \quad 1, \quad 1, \quad 1]$$
$$Lc = [0, \quad 0, \quad 0, \quad 0, \quad 17.97, \quad 0, \quad 0, \quad 0, \quad 0]$$

The executions of operations T2 (which precedes T5) and T1 (which precedes T2) are updated.

This semantically represents that, for the purposes of calculating the number of executions of operations, T5 is now a leaf node. Recall the execution computations of T1 in FIGS. 2A and 2B. With the caching of transformation T5, the three executions of T5 (one in the path to A1, one in the path to A2, and one in the paths to A3) are now reduced to one.

FIG. 5C illustrates exemplary pseudo code for the PropagateDiscountCost process 560, invoked by the exemplary GenCachedState process 500 of FIG. 5A, according to one embodiment of the disclosure. The exemplary PropagateDiscountCost process 560 is similar to the exemplary PropagateDiscountExecs process 530 of FIG. 5B, with the difference that it updates the total cost list of the state (line 1); and that the discount is propagated to all the following operations $\mathbb{D}$[i].f (line 2), instead of the preceding operations $\mathbb{D}$[i].p. This semantically represents that transformation T5 now does not contribute any cost to total cost of operations that follow it. The cost of executing T5 once is already considered in the state's applied cache cost list. Finally, upon reaching a previously cached transformation, the exemplary PropagateDiscountCost process 560 applies the discount to that transformation's caching cost and does not perform a recursive call.

Figure 6:
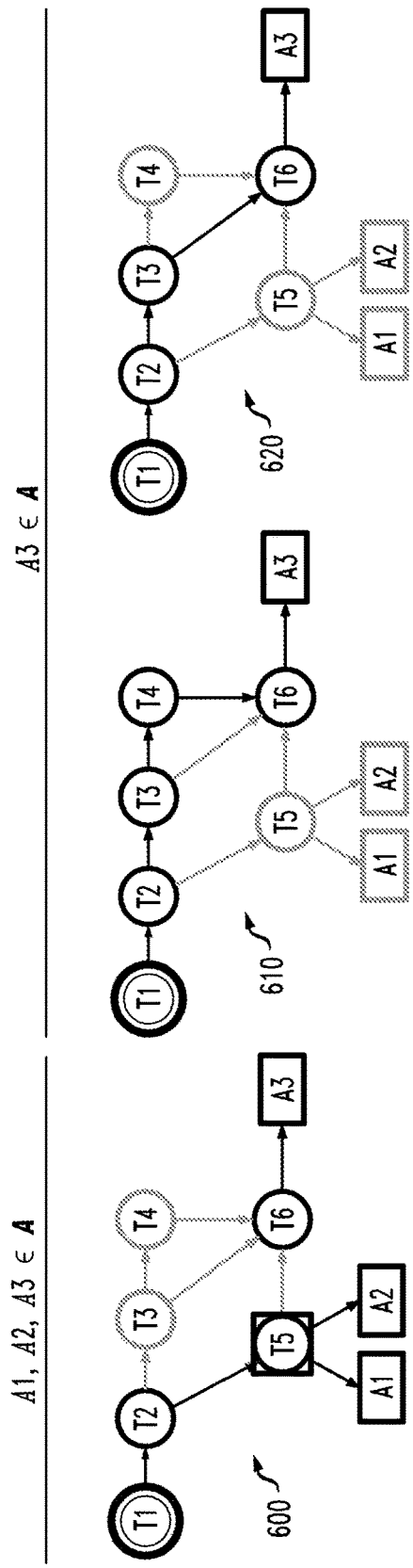
FIG. 6 illustrates the updated number of executions of transformation T1 from the dataflow of FIG. 1A, when operation T5 is cached, according to one embodiment of the disclosure.

FIG. 6 illustrates the updated number of executions of transformation T1 from the dataflow 100 of FIG. 1A, when operation T5 is cached, according to one embodiment of the disclosure. In FIG. 6, the caching of transformation T1 is represented by a circle within a square in the dataflow 600. The single execution of T5 is now re-used in one path to each of the actions A1, A2 in the dataflow 600 and in the paths to actions A3 in the dataflows 610, 620. The total number of executions of T1 in the resulting state is thus three (3).

D. Search for Multiple Cache Placements

FIG. 7 illustrates exemplary pseudo code for a LocalBeamCacheSearch process 700, according to one embodiment of the disclosure. Generally, the exemplary LocalBeamCacheSearch process 700 is a search method that automatically finds the best combination of cache placements given an input dataflow by leveraging the formal model, the estimation functions, the cache gain factor computation and the algorithm for updating operation properties presented before.

The exemplary LocalBeamCacheSearch process 700 exemplifies the concept of a beam search, in which the search space is pruned to a small number of promising candidate states. See, for example, P. Norvig, "Paradigms of Artificial Intelligence Programming: Case studies in Common LISP," (Morgan Kaufmann Publishers, Inc.; 1992), incorporated by reference herein in its entirety.

The terminology adopted is as follows. The LocalBeamCacheSearch process 700 starts with an initial state s in the open states list, O. Each state in the open list, O, is expanded, generating a set of new candidate states, C, which are themselves later expanded in a search-like approach. The LocalBeamCacheSearch process 700 will return the substantially best state among all generated candidates; i.e., the state with the substantially lowest cost (as defined in the section entitled "Dataflow State."

All expanded states are put into the closed states list, C, used to make sure no states are expanded twice. The search space is pruned by discarding some of the candidate states generated from every expanded state—only a limited number of the best new candidate states that are not yet closed are put into the open list; and also by limiting the maximum number of states in the open states list at any time.

The global substantially best state, best, is initially the initial state, s (line 1). Every expanded state is checked against the global substantially best (line 7), and becomes the global substantially best (line 8) if the expanded state results in a lower total cost for the dataflow. When no more states remain in the open list, the global substantially best is returned as the solution (line 13).

A more formal description follows. The exemplary LocalBeamCacheSearch process 700 works by iteratively generating new candidate states in a list of open states O, adding them to the closed states list C, and holding the best global state found in variable best. The LocalBeamCacheSearch process 700 receives as argument the dataflow $\mathbb{D}$, the initial state s and two parameters that prune the search space. The first parameter is beam, a maximum number of candidate states to be generated from any single state. The second parameter is limit, which defines the maximum number of states to be kept in the open states list.

The exemplary LocalBeamCacheSearch process 700 proceeds as follows. The best state is initialized as the initial state s (line 1). The open list O contains s initially (line 2) and the closed list is empty (line 3).

The loop (lines 4-12) configures the main part of the exemplary LocalBeamCacheSearch process 700. While there are still candidates to be considered in the open list o, the first entry is removed and stored in variable s' (line 5). This is done through a call to an auxiliary algorithm first, which removes and returns the first element of a list structure.

This expanded state s' is then appended to the closed list (line 6). This means that no equivalent state will be further expanded as the generation of new candidates disregards states that are already closed, as discussed further below in the description of a NewCandidates process 800 in conjunction with FIG. 8.

Next, the expanded state s' is compared to the best state. If the total dataflow execution cost in the current state is lower than the total dataflow cost in the best state, the best state so far is updated to reflect that the current state is the new best (lines 7 and 8). The total dataflow cost in a state is computed through an auxiliary algorithm StateCost, a straightforward implementation of the computation for the state cost described above.

A call to NewCandidates (line 9) returns the best beam possible states following s'. These candidate states are substantially guaranteed to not be closed states (i.e., previously expanded). Further details are given in the description of the NewCandidates process 800 in conjunction with FIG. 8, below.

The new candidates are concatenated with the open states list (line 10), and the open states list is sorted by descending total dataflow execution cost (line 11). This is done through a call to auxiliary method SortByCost which reorders the list so that states representing best cache placements are placed upfront.

Finally, the loop ends with the remaining open states list pruned to a maximum of limit entries. When the loop terminates the best state with the lowest total dataflow cost is returned. The operations that are to be cached can be identified by the non-zero applied caching cost values in best. Lc.

FIG. 8 illustrates exemplary pseudo code for the NewCandidates process 800, according to one embodiment of the disclosure. As noted above the exemplary NewCandidates process 800 is called by the LocalBeamCacheSearch process 700 of FIG. 7.

As shown in FIG. 8, the exemplary NewCandidates process 800 receives as arguments a state s, the dataflow $\mathbb{D}$, the list of closed states C and a maximum number of candidates to generate beam. The exemplary NewCandidates process 800 starts by obtaining a list of all cache gains, one for each operation in $\mathbb{D}$, through a call to an auxiliary algorithm GetCacheGains (line 1). This algorithm is a straightforward implementation of the method described in the section entitled "Cache Gain Factor Computation," for each transformation in the dataflow with the transaction.

Next, the exemplary NewCandidates process 800 collects a list I of the indexes of the operations whose cache gains are positive (line 2). This list configures the possible caches that are estimated to result in a net decrease in the total dataflow cost.

The list of new candidates N is initialized as empty (line 3) and filled in the loop (lines 4-7). For each possible cache, a state s' representing that caching is generated (line 5). This is done through a call to the GenCachedState process 500 of FIG. 5A. If this state is not contained in the closed list C, it is added to the list of new candidate states (lines 6-7). After the loop, the list of new candidates N is sorted (line 8) by descending total dataflow cost, and the first beam entries are returned (line 9).

Example

Many service providers and large industries design their business processes as workflows. Many activities of those processes are completely automated as a set of scripts and computer programs, including domain-specific algorithms developed for years. For instance, in the Oil and Gas industry, seismic processing workflows are key in the exploration process to discover new reservoirs. The data-intensive nature of these workflows makes them natural candidates to run on modern dataflow engines such as the Spark™ or Flink™ dataflow engines referenced above.

However, these workflows are complex and incorporate much of the technical domain knowledge, which makes them hard to be manually optimized by the general user. The choice of parameters and the input data might influence the behavior of the execution in such a way that is hard for the user to predict how output data will be actually produced. For instance, many filters can be applied to seismic data to evince geological faults and the choice of filters will impact in the size of intermediate data and the final seismic cube.

In the present disclosure, a method is disclosed that can automatically define the optimal cache placement in such dataflows, as long as accurate cost models for the execution of the operations are provided. The method frees the user from the task of explicitly defining when and where these cache operations should take place in the dataflow, a very time consuming and costly task, in particular when the features of the datasets vary significantly.

Furthermore, this task is error-prone and not trivial even for experienced users. On the one hand, a poor decision of cache placement can actually hinder dataflow performance, incurring in higher costs of execution. On the other hand, an optimized dataflow, yielded by the method described in this disclosure, means significant savings in resource allocation and execution time.

CONCLUSION

One or more embodiments of the disclosure provide methods and apparatus for automatic placement of cache operations. In one or more embodiments, a formal model is employed to define a representation of dataflows for the cache placement problem. The disclosed model defines the representation of operation ordering dependencies and properties. Among other benefits, the disclosed model allows evaluation of cache placement alternatives, including the evaluation of the properties and parameters needed to evaluate the datasets that should be cached.

In some embodiments, an exemplary method estimates the impact on the dataflow performance when caching datasets. The impact is measured using the disclosed formal dataflow model and a set of disclosed estimation functions. The formal foundations substantially define the elements that should be considered when evaluating the cache placement. These estimation functions provide information on the number of executions, the costs of executing and the cost of caching the resulting dataset of an operation.

In this manner, one or more embodiments of the disclosure automatically define multiple cache placements that configure a substantially global optimization of the dataflow. The exemplary method takes into account the fact that caching one operation affects the cost of execution operations that precede it and follow it in the dataflow.

At least one embodiment substantially guarantees that only the costs of operations affected by a cache placement are recalculated, without the need for the recomputation of an entire dataflow graph. The disclosed exemplary model represents a dataflow cache placement state detached from the dataflow graph, which substantially reduces the size of the state in memory and allows the exemplary method to keep many such states as candidates at any given time. Both these optionally aspects support and enable the tractability of larger problems.

The dataflows often require an extensive use of memory as an intermediate space for storing data between dataflow operations. In particular, data-intensive dataflows that are I/O-bound need a substantially optimized use of memory in order to avoid swapping operations. In one or more embodiments of the disclosure, the automatic evaluation of cache placement allows the memory space set for cache placement to be substantially optimized.

The foregoing applications and associated embodiments should be considered as illustrative only, and numerous other embodiments can be configured using the techniques disclosed herein, in a wide variety of different applications.

It should also be understood that the disclosed techniques for automatic placement of cache operations, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automatic placement of cache operations may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as an automatic cache operation placement device, or portions thereof, are illustratively implemented for use by tenants of such a multi-tenant environment.

Cloud infrastructure as disclosed herein can include cloud-based systems such as Amazon Web Services, GCP and Microsoft Azure™. Virtual machines provided in such systems can be used to implement at least portions of an automatic cache operation placement platform in illustrative embodiments. The cloud-based systems can include object stores such as Amazon™ S3, GCP Cloud Storage, and Microsoft Azure™ Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the automatic cache placement devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
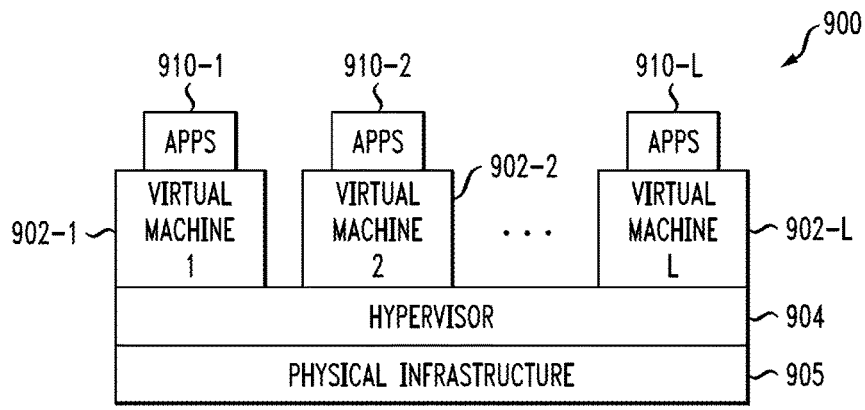
FIGS. 9 and 10 show examples of processing platforms that may be utilized to implement at least a portion of the disclosed automatic cache placement information processing systems.

Referring now to FIG. 9, one possible processing platform that may be used to implement at least a portion of one or more embodiments of the disclosure comprises cloud infrastructure 900. The cloud infrastructure 900 in this exemplary processing platform comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

The cloud infrastructure 900 may encompass the entire given system or only portions of that given system, such as one or more of client, servers, controllers, or computing devices in the system.

Although only a single hypervisor 904 is shown in the embodiment of FIG. 9, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 904 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products, such as VNX™ and Symmetrix VMAX™, both commercially available from Dell EMC. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed automatic cache placement systems may each run on a computer, server, storage device or other processing platform element. A given such element may be viewed as an example of what is more generally referred to herein as a "processing device." The cloud infrastructure 900 shown in FIG. 9 may represent at least a portion of one processing platform.

Figure 10:
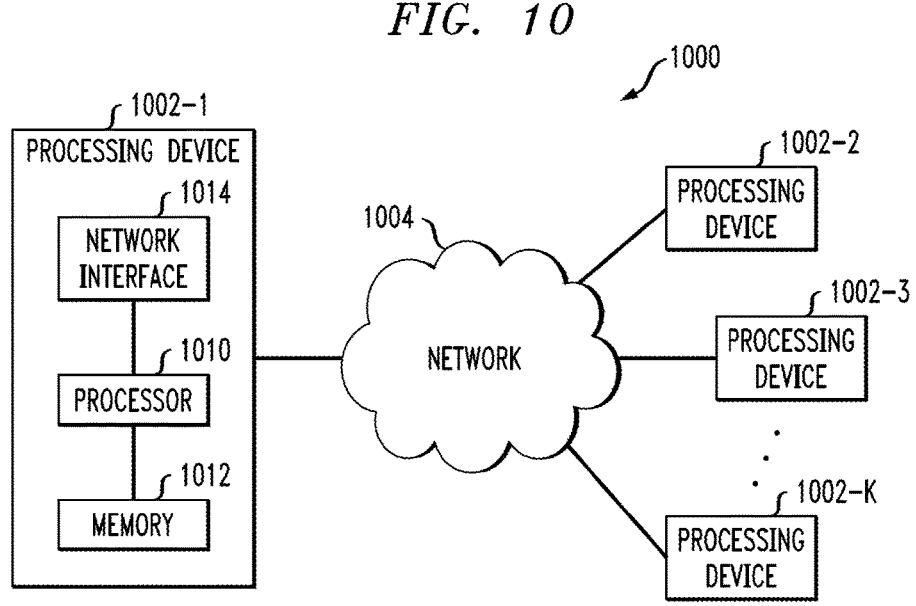

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of pseudo code shown in FIGS. 5A-5C, FIG. 7 and FIG. 8 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, and automatic cache placement platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A method, comprising the steps of:
obtaining a representation of a dataflow comprised of a plurality of operations as a directed graph, wherein vertices in said directed graph represent operations and edges in said directed graph represent data dependencies between said operations;
determining, using at least one processing device, a number of executions of said operations, a computational cost of said operations and a computational cost of a caching operation to cache a given dataset generated by at least one of said operations based on a size of said given dataset and a cost of said caching operation, wherein said computational cost of a given operation comprises an individual cost of executing the given operation itself and an accumulated cost of additional operations required to generate an input dataset for the given operation, wherein said given operation is represented in a data structure comprising said individual cost of executing the given operation itself, said accumulated cost of additional operations required to generate an input dataset for the given operation and said computational cost of said caching operation to cache said given dataset generated by said given operation;

establishing, using said at least one processing device, a dataflow state structure for each of a number of variations of caching one or more operations of the dataflow, wherein a given dataflow state structure records values for a plurality of properties of the operations in the dataflow, given zero or more existing cached operations in a given dataflow state, wherein said given dataflow state structure comprises a list of the accumulated costs of the operations in the given dataflow state, a list of the number of executions of said operations in the given dataflow state, and a list of a cache cost of the operations in the given dataflow state;

determining, using said at least one processing device, for each of said dataflow states, a cache gain factor for each operation in the dataflow as an estimated reduction in the accumulated cost of the dataflow by caching an output dataset of the given operation;

determining, using said at least one processing device, a change in said dataflow state structure by caching an output dataset of a different operation in said dataflow, wherein said change propagates changes in said list of the accumulated costs of the operations in the changed dataflow state structure and said list of the number of executions of said operations in the changed dataflow state structure, and applies the cache cost of the different operation to said list of said cache cost of the operations in the changed dataflow state structure; and dynamically searching, using said at least one processing device, a plurality of said dataflow state structures to automatically determine a combination of said output datasets of a subset of said operations in said dataflow to cache based on a total execution cost for the dataflow.

2. The method of claim 1, wherein said step of dynamically searching comprises determining a state cost for each dataflow state.

3. The method of claim 2, wherein said state cost for a given dataflow state comprises a sum of said list of the accumulated costs of the operations in the given dataflow state and a sum of the cache costs of the operations in the given dataflow state.

4. The method of claim 2, wherein said step of dynamically searching further comprises the steps of starting with an initial state in an open states list, an empty closed states list, and said initial state as a current global selected state; expanding each state in the open states list, inserting each of said expanded states into the closed states list, generating a set of new candidate states with lower state cost than said expanded state and having said expanded state become the current global selected state if said expanded state has a lower cost than the current global selected state; inserting each state in the new candidate set that is not in the closed states list into the open states list; sorting the open states list by ascending order of state cost; and returning the current global selected state configuring a state based on a state cost.

5. The method of claim 4, wherein said step of dynamically searching further comprises one or more of pruning the search space by discarding one or more of the candidate states generated from every expanded state; and pruning the search space by limiting a number of states in the open states list at any time.

6. The method of claim 1, wherein one or more of said computational cost of said operations and said computational cost of said caching operation to cache said given dataset comprises one or more resource costs.

7. The method of claim 1, wherein said plurality of operations comprise a plurality of lazy-evaluated data transformations and a plurality of data actions that enact the lazy-evaluated data transformations.

8. The method of claim 1, wherein said cache gain factor of said given operation is based on said accumulated cost of said given operation multiplied by a number of spared re-executions of said given operation saved by said caching of said output dataset of the given operation offset by said computational cost of said caching operation.

9. A computer program product, comprising a non-transitory machine-readable storage medium having encoded therein executable code of one or more software programs, wherein the one or more software programs when executed by at least one processing device perform the following steps:

obtaining a representation of a dataflow comprised of a plurality of operations as a directed graph, wherein vertices in said directed graph represent operations and edges in said directed graph represent data dependencies between said operations;

determining, using at least one processing device, a number of executions of said operations, a computational cost of said operations and a computational cost of a caching operation to cache a given dataset generated by at least one of said operations based on a size of said given dataset and a cost of said caching operation, wherein said computational cost of a given operation comprises an individual cost of executing the given operation itself and an accumulated cost of additional operations required to generate an input dataset for the given operation, wherein said given operation is represented in a data structure comprising said individual cost of executing the given operation itself, said accumulated cost of additional operations required to generate an input dataset for the given operation and said computational cost of said caching operation to cache said given dataset generated by said given operation;

establishing, using said at least one processing device, a dataflow state structure for each of a number of variations of caching one or more operations of the dataflow, wherein a given dataflow state structure records values for a plurality of properties of the operations in the dataflow, given zero or more existing cached operations in a given dataflow state, wherein said given dataflow state structure comprises a list of the accumulated costs of the operations in the given dataflow state, a list of the number of executions of said operations in the given dataflow state, and a list of a cache cost of the operations in the given dataflow state;

determining, using said at least one processing device, for each of said dataflow states, a cache gain factor for each operation in the dataflow as an estimated reduction in the accumulated cost of the dataflow by caching an output dataset of the given operation;

determining, using said at least one processing device, a change in said dataflow state structure by caching an output dataset of a different operation in said dataflow, wherein said change propagates changes in said list of the accumulated costs of the operations in the changed dataflow state structure and said list of the number of executions of said operations in the changed dataflow state structure, and applies the cache cost of the different operation to said list of said cache cost of the operations in the changed dataflow state structure; and dynamically searching, using said at least one processing device, a plurality of said dataflow state structures to automatically determine a combination of said output datasets of a subset of said operations in said dataflow to cache based on a total execution cost for the dataflow.

10. The computer program product of claim 9, wherein said step of dynamically searching comprises determining a state cost for each dataflow state, wherein said state cost for a given dataflow state comprises a sum of said list of the accumulated costs of the operations in the given dataflow state and a sum of the cache costs of the operations in the given dataflow state.

11. The computer program product of claim 9, wherein one or more of said computational cost of said operations and said computational cost of said caching operation to cache said given dataset comprises one or more resource costs.

12. The computer program product of claim 9, wherein said cache gain factor of said given operation is based on said accumulated cost of said given operation multiplied by a number of spared re-executions of said given operation saved by said caching of said output dataset of the given operation offset by said computational cost of said caching operation.

13. A system, comprising:

a memory; and at least one processing device, coupled to the memory, operative to implement the following steps:

obtaining a representation of a dataflow comprised of a plurality of operations as a directed graph, wherein vertices in said directed graph represent operations and edges in said directed graph represent data dependencies between said operations;

determining, using said at least one processing device, a number of executions of said operations, a computational cost of said operations and a computational cost of a caching operation to cache a given dataset generated by at least one of said operations based on a size of said given dataset and a cost of said caching operation, wherein said computational cost of a given operation comprises an individual cost of executing the given operation itself and an accumulated cost of additional operations required to generate an input dataset for the given operation, wherein said given operation is represented in a data structure comprising said individual cost of executing the given operation itself, said accumulated cost of additional operations required to generate an input dataset for the given operation and said computational cost of said caching operation to cache said given dataset generated by said given operation;

establishing, using said at least one processing device, a dataflow state structure for each of a number of variations of caching one or more operations of the dataflow, wherein a given dataflow state structure records values for a plurality of properties of the operations in the dataflow, given zero or more existing cached operations in a given dataflow state, wherein said given dataflow state structure comprises a list of the accumulated costs of the operations in the given dataflow state, a list of the number of executions of said operations in the given dataflow state, and a list of a cache cost of the operations in the given dataflow state;

determining, using said at least one processing device, for each of said dataflow states, a cache gain factor for each operation in the dataflow as an estimated reduction in the accumulated cost of the dataflow by caching an output dataset of the given operation;

determining, using said at least one processing device, a change in said dataflow state structure by caching an output dataset of a different operation in said dataflow, wherein said change propagates changes in said list of the accumulated costs of the operations in the changed dataflow state structure and said list of the number of executions of said operations in the changed dataflow state structure, and applies the cache cost of the different operation to said list of said cache cost of the operations in the changed dataflow state structure; and dynamically searching, using said at least one processing device, a plurality of said dataflow state structures to automatically determine a combination of said output datasets of a subset of said operations in said dataflow to cache based on a total execution cost for the dataflow.

14. The system of claim 13, wherein said step of dynamically searching comprises determining a state cost for each dataflow state.

15. The system of claim 14, wherein said state cost for a given dataflow state comprises a sum of said list of the accumulated costs of the operations in the given dataflow state and a sum of the cache costs of the operations in the given dataflow state.

16. The system of claim 14, wherein said step of dynamically searching further comprises the steps of starting with an initial state in an open states list, an empty closed states list, and said initial state as a current global selected state; expanding each state in the open states list, inserting each of said expanded states into the closed states list, generating a set of new candidate states with lower state cost than said expanded state and having said expanded state become the current global selected state if said expanded state has a lower cost than the current global selected state; inserting each state in the new candidate set that is not in the closed states list into the open states list; sorting the open states list by ascending order of state cost; and returning the current global selected state configuring a state based on a state cost.

17. The system of claim 16, wherein said step of dynamically searching further comprises one or more of pruning the search space by discarding one or more of the candidate states generated from every expanded state; and pruning the search space by limiting a number of states in the open states list at any time.

18. The system of claim 13, wherein one or more of said computational cost of said operations and said computational cost of said caching operation to cache said given dataset comprises one or more resource costs.

19. The system of claim 13, wherein said plurality of operations comprise a plurality of lazy-evaluated data transformations and a plurality of data actions that enact the lazy-evaluated data transformations.

20. The system of claim 13, wherein said cache gain factor of said given operation is based on said accumulated cost of said given operation multiplied by a number of spared re-executions of said given operation saved by said caching of said output dataset of the given operation offset by said computational cost of said caching operation.

* * * * *